(12) United States Patent
Swaminathan et al.

(10) Patent No.: US 8,401,188 B1
(45) Date of Patent: Mar. 19, 2013

(54) SYSTEM AND METHOD FOR PARTIAL ENCRYPTION OF FRAME-BASED ELECTRONIC CONTENT

(75) Inventors: Viswanathan Swaminathan, Fremont, CA (US); Saayan Mitra, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 740 days.

(21) Appl. No.: 12/610,043

(22) Filed: Oct. 30, 2009

(51) Int. Cl.
*H04L 29/00* (2006.01)
(52) U.S. Cl. .................................. 380/217; 380/200
(58) Field of Classification Search .................. None
See application file for complete search history.

(56) References Cited

U.S. PATENT DOCUMENTS

| | | | | |
|---|---|---|---|---|
| 5,805,700 | A * | 9/1998 | Nardone et al. | 380/217 |
| 6,415,031 | B1 * | 7/2002 | Colligan et al. | 380/200 |
| 7,295,673 | B2 * | 11/2007 | Grab et al. | 380/239 |
| 7,406,176 | B2 * | 7/2008 | Zhu et al. | 380/200 |
| 2009/0003600 | A1 * | 1/2009 | Chen et al. | 380/217 |

OTHER PUBLICATIONS

Agi et al., An Empirical Study of Secure MPEG Video Transmissions, 1996, IEEE.*
Spanos, Performance Study of a Selective Encryption Scheme for the Security of Networked, Real-Timed Video, 1995, IEEE.*

* cited by examiner

*Primary Examiner* — Minh Dinh
(74) *Attorney, Agent, or Firm* — Wolfe-SBMC

(57) ABSTRACT

Various embodiments of a system and method for partial encryption of frame-based electronic content are described. Embodiments may include a partial encryption component configured to receive electronic content that includes multiple frames to be displayed according to a chronological sequence. In various embodiments, such frames may include multiple key frames and multiple reference frames. For each reference frame, content of one or more other frames may be dependent on the content of that reference frame. In various embodiments, for each key frame, content of frames to be displayed subsequent to that key frame may not be dependent on content of any frame preceding the key frame in the chronological sequence. In various embodiments, the partial encryption component may be configured to generate partially encrypted content by encrypting a portion of the electronic content without encrypting other portions of the electronic content (e.g., at least some key frames and reference frames).

20 Claims, 10 Drawing Sheets

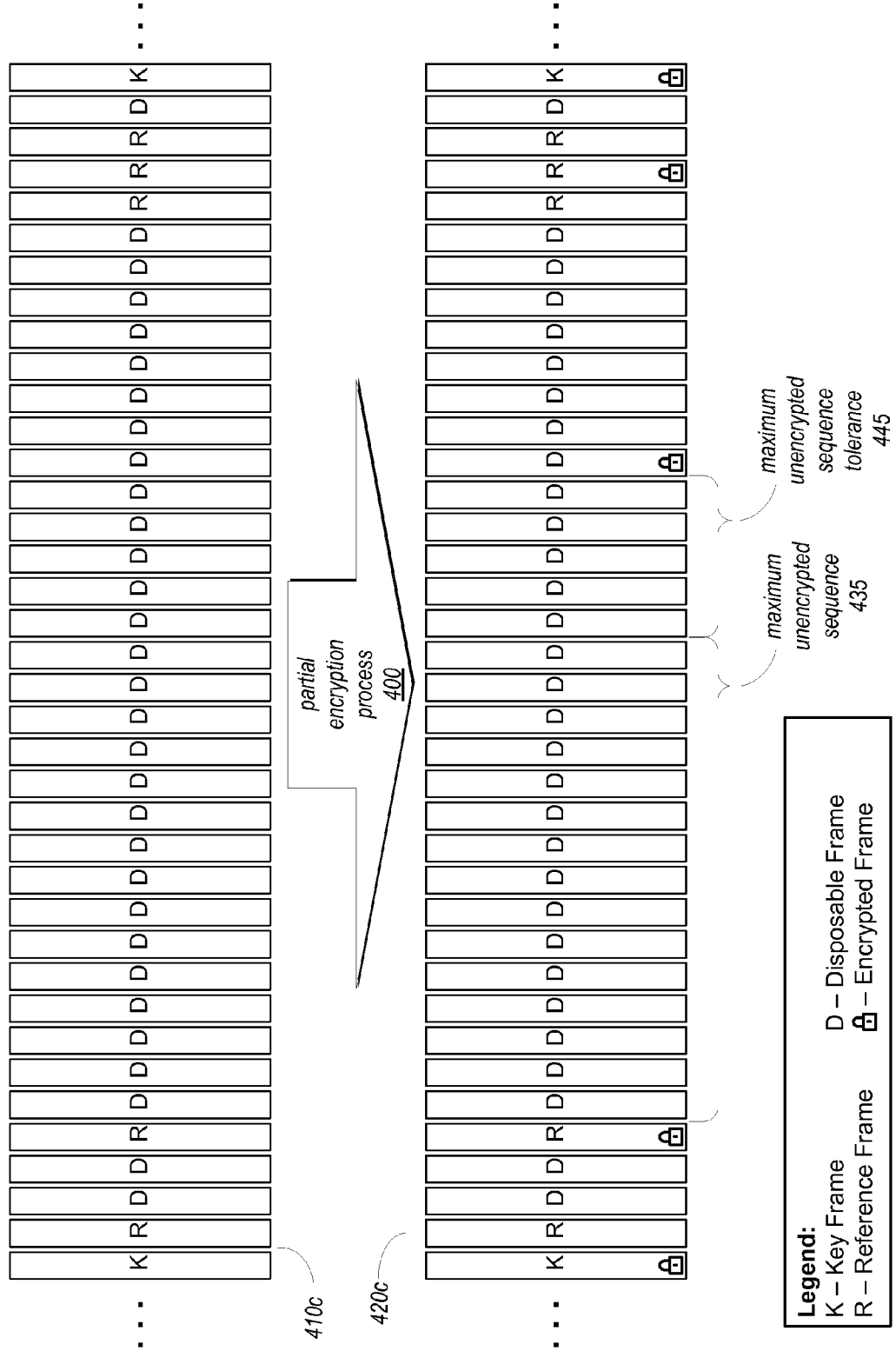

SYSTEM AND METHOD FOR PARTIAL ENCRYPTION OF FRAME-BASED ELECTRONIC CONTENT

BACKGROUND

Encryption may include techniques for transforming information such that the information is unreadable to parties without possession of certain knowledge, such as an encryption key. Encryption may be used to protect different types of information. For instance, two parties seeking secure communication may encrypt transmissions of information with an encryption key to protect unauthorized parties from accessing the "clear text" (e.g., unencrypted) version of the information. Such an encryption key may be secret information previously exchanged by the parties in a secure manner. In other cases, encryption may be used as a mechanism to prevent unauthorized access to digital content, such as might be employed in a digital rights management scheme. For instance, electronic content (e.g., electronic representations of audio, video, or multimedia) may be encrypted to ensure that only authorized individuals may readily access the content. Examples of authorized individuals might include a customer that has purchased a license to view the content. In some implementations of digital rights management, a content license may include a cryptographic key for decrypting content to which the license corresponds. In this way, a customer that purchased rights to the content (and thus holds such license) may decrypt the content whereas unauthorized users (without access to such license) cannot decrypt the content.

The quantity of processing resources required to encrypt (or decrypt) a particular portion of content may depend on various factors. One of such factors may include the quantity of processing resources on hand. For instance, robust computing workstations might be able to encrypt or decrypt information at a rate faster than systems with less computing resources, such as a mobile handheld device. Another one of such factors may include the size of the information to be encrypted or decrypted. For instance, a given system may be able to encrypt or decrypt a single photo faster than it is able to encrypt or decrypt information with a much larger data footprint, such as a full length movie.

SUMMARY

Various embodiments of a system and method for partial encryption of frame-based electronic content are described. Embodiments may include a partial encryption component configured to receive electronic content that includes multiple frames to be displayed according to a chronological sequence. Examples of such content may include electronic representations of video or animations. In various embodiments, such frames may include multiple key frames and multiple reference frames. For each reference frame, content of one or more other frames may be dependent on the content of that reference frame. For instance, compressed frame-based content (e.g., video) may include dependencies across frames that are caused by interframe compression techniques. In various embodiments, for each key frame, content of frames to be displayed subsequent to that key frame may not be dependent on content of any frame preceding the key frame in the chronological sequence. In one example, a key frame may include all the necessary data to begin a stream of content (e.g., because frames that are to be displayed subsequent to the key frame will not depend on frames before the key frame).

In various embodiments, the partial encryption component may be configured to generate partially encrypted content by encrypting a portion of the electronic content without encrypting other portions of the electronic content. Encrypting a portion of the content may include encrypting at least some of the key frames of the electronic content and encrypting at least some of the multiple reference frames of the electronic content. In one particular example, the partial encryption component may be configured to encrypt all key frames of the content and a particular pattern of reference frames based on the chronological sequence for display. For instance, the partial encryption component may encrypt all key frames and every $n^{th}$ reference frame (where "n" is a positive integer).

BRIEF DESCRIPTION OF THE DRAWINGS

FIGS. 4A-C illustrate the encryption of frame-based electronic content according to a partial encryption process, according to some embodiments.

Figure 1:
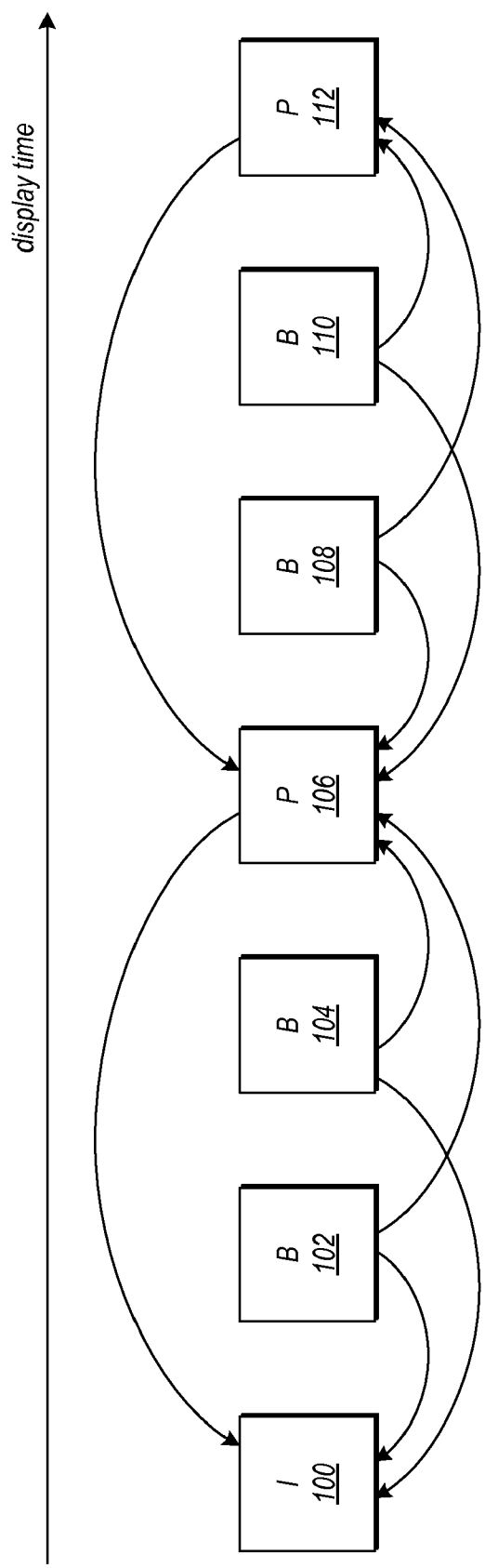
FIG. 1 illustrates a frame diagram representing the dependencies of multiple frames of frame-based electronic content, according to some embodiments.

While the system and method for partial encryption of frame-based electronic content is described herein by way of example for several embodiments and illustrative drawings, those skilled in the art will recognize that the system and method for partial encryption of frame-based electronic content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for partial encryption of frame-based electronic content are described.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various portions of this description may reference the encryption or partial encryption of data. In various embodiments, such encryption may include performing any of a variety of encryption algorithms or methods including but not limited to algorithms or methods for symmetric key encryption, algorithms or methods for public key encryption, and/or techniques for some other type of encryption, whether presently known or developed in the future.

Embodiments of a system and method for partial encryption of frame-based electronic content are described. In various embodiments, frame-based electronic content may include any electronic or digital content that includes multiple digital frames. Generally, a frame may be one of multiple images that make up a video, film, animation or some other type of moving picture. In various embodiments, frame-based electronic content may include a chronological sequence according to which the frames are to be displayed at playback time. This chronological sequence may be explicitly specified within the frame-based content, such as an absolute or relative timeline that maps frames to a display order. In other cases, the chronological sequence may be implicitly specified by the ordering of the frames within the content. At playback time, frames of the frame-based electronic content may be displayed according to the aforesaid chronological sequence, sometimes in rapid succession depending on the frame-rate of the frame-based electronic content. For instance, a video clip with a 30 frames per second (fps) frame rate will result in the playback of 30 frames for every second of the video clip. In this example, if the video clip were 20 seconds long, playback of the video clip would result in the display of 600 distinct video frames.

One example of frame-based electronic content includes electronic media content adhering to the FLV/F4V file format specification. The FLV/F4V specification documents the file formats for storing media content used to deliver audio and video playback in Adobe® Flash® Player and Adobe® AIR™ software applications. In various embodiments, frame-based electronic content may be stored in other file formats. Note that in various embodiments, frame-based electronic content need not be limited to content including rectangular frames. In some embodiments, any other frame shape may be utilized. In some embodiments, frame-based electronic content may include any electronic content having a visual representation that changes over time, which may be referred to as time-based electronic content.

In various embodiments, frame-based electronic content may include content that has been compressed or "encoded" according to any of various video compression standards. Examples of such a video compression standard include the H.264 and MPEG-4 AVC standards for video compression. Generally, compressing frame-based electronic content may decrease the quantity of data or information utilized to represent the content. In various embodiments, compression may include utilizing spatial image compression and/or temporal motion compensation. Such techniques may include intraframe compression, which may be similar to image compression, and/or interframe compression, which may utilize similarities or redundancies across multiple frames to decrease the collective data footprint of multiple frames.

In various embodiments, compression may create dependencies among some of the frames in frame-based electronic content. FIG. 1 illustrates a frame diagram that includes multiple frames of the same frame-based electronic content. The illustrated embodiment includes three types of frames: intra frames or "I-frames" (denoted by an "I" in FIG. 1), predicted frames or "P-frames" (denoted by a "P" in FIG. 1), and bidirectional frames or "B-frames" (denoted by a "B" in FIG. 1). In various embodiments, I-frames may be frames that include content that is not dependent on content of other frames. In various embodiments, this property may enable a playback component (e.g., a software or hardware renderer) to recreate the frame without utilizing any other frame. One example of an I-frame is illustrated as I-frame 100 of FIG. 1. Dependencies in FIG. 1 are denoted by arrows extending from a given frame to a second frame on which the given frame is dependent. For clarity, this may mean that at least some of the content of the given frame is dependent on at least some of the content of the second frame. In various embodiments, such dependencies may be created by the interframe compression described above. Note that I-frame 100 has multiple dependency arrows extending to it, but no arrows extending from it, which is consistent with the property that the content of I-frames may not be dependent on the content of other frames. As used herein, when a first frame is said to depend from a second frame, this phrase may mean that content of the first frame depends on or is derived from content of the second frame. In various embodiments, such dependencies are created by the compression techniques described herein.

In various embodiments, B-frames may be frames that include content that is dependent on content from frames in the past (e.g., a frame positioned before that B-frame in the sequence of frames to be displayed) and in the future (e.g., a frame positioned subsequent to that B-frame in the sequence of frames to be displayed). Note that in the illustrated embodiment lower-numbered frames (e.g., I-frame 100) are to be displayed prior to higher numbered frames (e.g., B-frame 102). Examples of B-frames include B-frames 102, 104, 108 and 110. In various embodiments, B-frames may be dependent on both I-frames and P-frames. For instance, B-frame 102 is dependent on both I-frame 100 and P-frame 106.

In various embodiments, P-frames may be frames that include content that is dependent on an I-frame or P-frame in the past (e.g., a frame positioned before that B-frame in the sequence of frames to be displayed). Examples of P-frames include P-frame 106 and P-frame 112. For instance, P-frame 106 is dependent on one frame in the past, namely I-frame 100.

Figure 2:
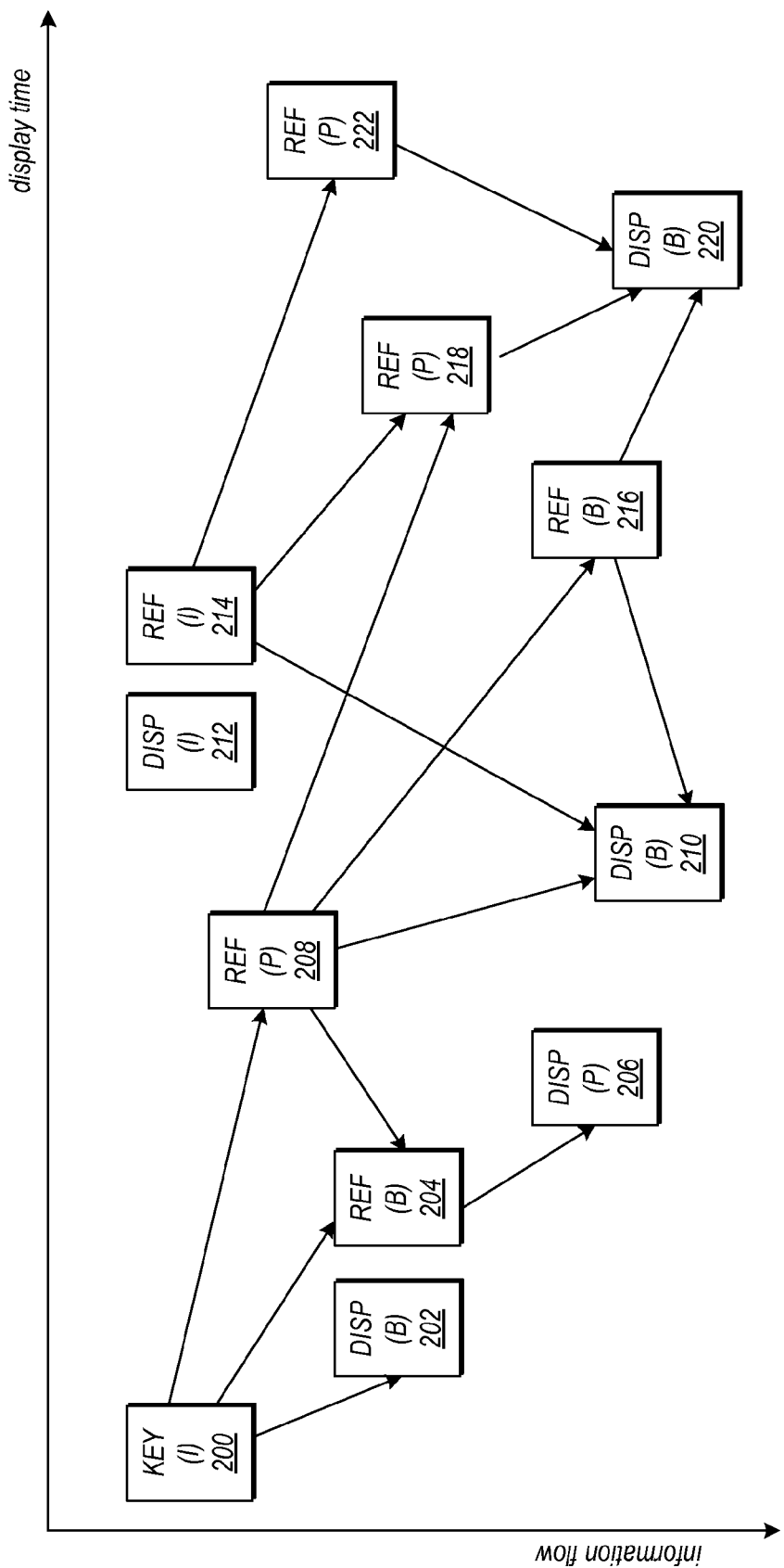
FIG. 2 illustrates another frame diagram representing the dependencies of multiple frames of frame-based electronic content, according to some embodiments.

In addition to (or as an alternative to) the I-frame, B-frame, P-frame configuration described above, the frames of some frame-based electronic content may be configured as key frames, reference frames, and disposable frames, which are described in more detail below. FIG. 2 illustrates a frame diagram that includes key frames, reference frames, and disposable frames and also indicates the dependencies among such frames. Note that each frame also has a corresponding I-, B-, or P-frame designation in parenthetical form. Dependencies in FIG. 2 are denoted by arrows extending from a given frame to a second frame on which the given frame is dependent. Again, this may mean that at least some of the content of the given frame is dependent on at least some of the content of the second frame. In various embodiments, such dependencies may be created by the interframe compression described above. Different types of compression methods, techniques, and/or algorithms may generate compressed content that includes key frames, reference frames, and disposable frames. Examples of such include the H.264 and MPEG-4 AVC standards for video compression. Generally, the partial encryption techniques described herein may be applied to any content that can be reduced to a set of disposable, reference and key frames, such as those frames described with respect to FIG. 2.

In the illustrated embodiment, frames 200-220 may make up a portion of frame-based electronic content that includes multiple key frames, reference frames, and disposable frames. In various embodiments, a key frame may be a frame that includes all of the necessary information to begin a stream of frame-based electronic content. In various embodiments, this may mean that each frame to be displayed after the key frame will not depend on a frame prior to the key frame. In various embodiments, this may also mean that frames before a key frame will not depend on frames after the key frame. One particular example of a key frame is an independent decoder refresh frame, which is described in more detail below in regard to the H.264 compression standard. Depending on how the compression stage is configured, key frames may be placed at regular (e.g., periodic) or irregular (e.g., aperiodic) intervals within compressed content. In an example including content that has key frames placed at two second intervals, a playback component would have to wait no longer than two seconds in order to display a stream of the content without attempting to render frames that are dependent upon frames in the past (which may not be available to the playback component). For instance, if the playback component began receiving frame-based content in between key frames (as might be the case when a digital set top box tunes into a particular television channel, for example), the playback component could simply wait to render the frame-based content until the playback component receives the next key frame, at which point the playback component would have the requisite information to render any subsequent frame (assuming no data loss in the content stream). By waiting for the next key frame, the playback component can avoid attempting to render a frame that depends on another frame to which the playback component does not have access. While two seconds is given as the example above, various other embodiments may include electronic content that includes key frames at different intervals (regular or irregular). In some embodiments, key frames may be placed at specific points within content, such as at a scene change (e.g., the time boundary between two different scenes). One example of a key frame is illustrated by key frame 200 of FIG. 2. Note that only one key frame is presented in FIG. 2 for clarity of illustration. Indeed, in various embodiments, frame-based content may include any number of key frames.

Note that key frames may differ from I-frames in various ways. In one example, frames positioned subsequent to an I-frame may depend on frames positioned before that I-frame, in various embodiments. For instance, in FIG. 2, instead of depending on I-frame 100, B-frame 102 could potentially depend on a frame before I-frame 100. In various embodiments, the same cannot be said for key frames. For instance, in various embodiments, the compression techniques described herein may ensure that frames positioned after a key frame will not depend on frames positioned before that key frame. In some cases, key frames may be considered to be a particular type of I-frame, one having the properties described above. In some embodiments, only I-frames may be candidates to be a key frame. In such embodiments, P-frames and B-frames cannot be key frames.

In general, a key frame may include any frame meeting the description provided above. One particular example of a key frame includes an Independent Decoder Refresh (IDR) frame of the H.264 compression standard. In various embodiments, key frames from other compression standards may be utilized, whether such compression standards are presently known or developed in the future.

FIG. 2 also illustrates various references frames, such as reference frames 204, 208, 214, 216, 218 and 222. Generally, a reference frame may be a frame upon which at least one other frame depends. Reference frames may be I-, P-, or B-frames. In some embodiments, all key frames may be reference frames but not all reference frames may be key frames. FIG. 2 also illustrates various disposable frames, such as disposable frames 202, 206, 210, 212 and 220. Generally, a disposable frame may be a frame upon which no other frame depends. In various embodiments, no frames of the frame-based content will depend on a disposable frame.

The determination of whether a frame is an I-frame, B-frame, P-frame, key frame, reference frame, and/or a disposable frame may depend on the compression technique used. In some embodiments, each frame's designation may be the result of whatever designation provides the best level of compression, where the best level of compression may be optimized for various metrics including compression or decompression speed and/or the percentage by which the compression reduces the data footprint of the content. In various embodiments, content may include metadata (e.g., overall metadata for the content or per-frame metadata) that specifies each frames designation as an I-frame, B-frame, P-frame, key frame, reference frame, and/or a disposable frame.

Figure 3:
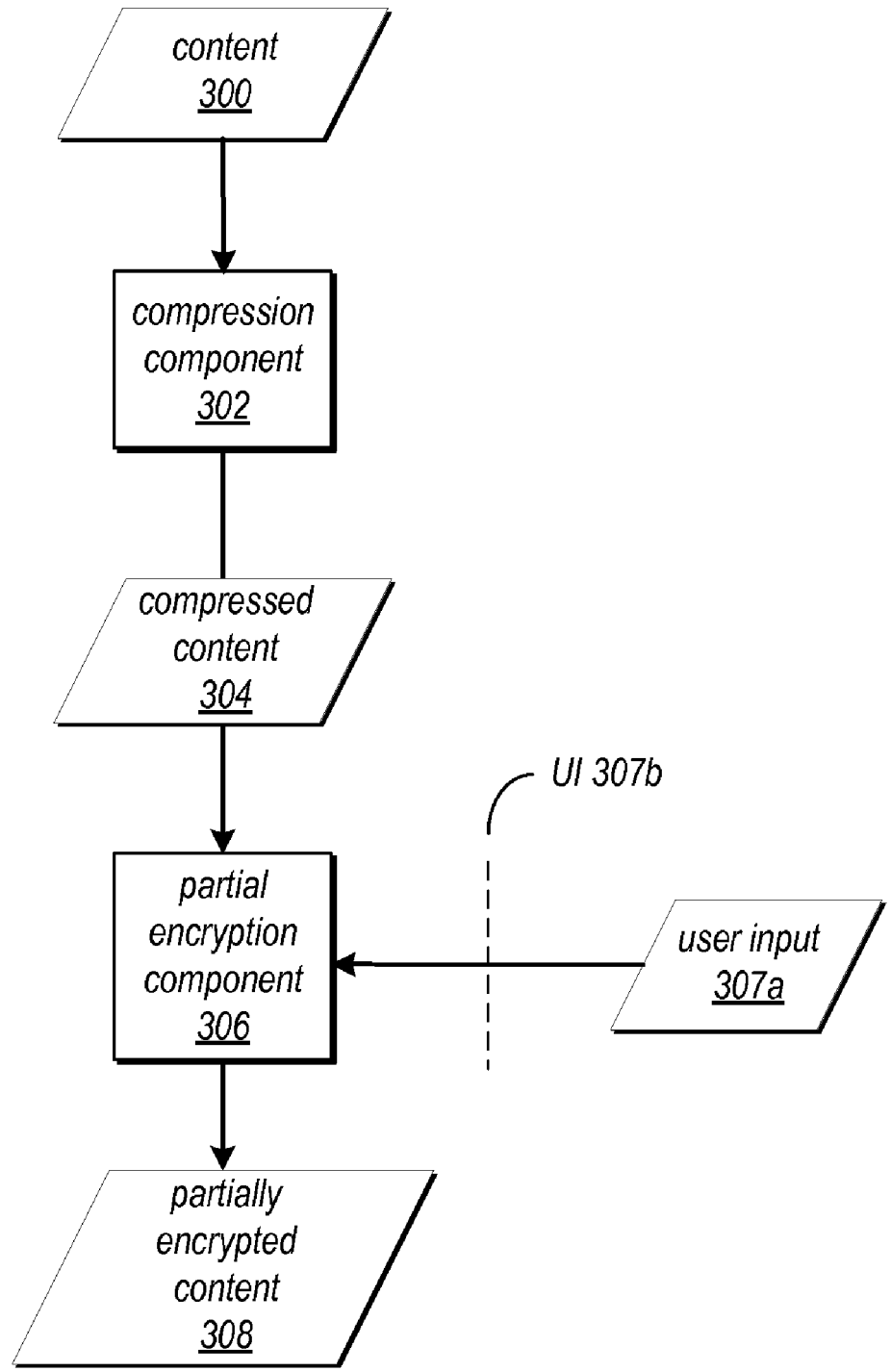
FIG. 3 illustrates a dataflow diagram representing the compression and partial encryption of frame-based electronic content, according to some embodiments.

Various embodiments may include a partial encryption component configured to partially encrypt frame-based electronic content (which may be referred to herein as simply "content") according to a variety of techniques. One example of such a component is illustrated as partial encryption component 306 of FIG. 3. FIG. 3 illustrates a flow diagram representing the aforesaid partial encryption process. In various instances, FIG. 3 may be described collectively with subsequent Figures. Note that content 300 of FIG. 3 may include any of the content described above, such as frame-based electronic content that includes one or more key frames, reference frames, and/or disposable frames. In various embodiments, a compression component 302 may be configured to compress frame-based electronic content 300 according to any of the compression techniques described above. In one example, compression component 302 may be configured to compress content 300 according to any of the compression standards described above, such as H.264. In some cases, these standards may be referred to as codecs or compression codecs. The result of the compression performed by compression component 302 is illustrated as compressed content 304, which may be provided to partial encryption component 306.

Partial encryption component 306 may be configured to partially encrypt compressed content 304 to generate encrypted content 308. In various embodiments, the partial encryption may be performed at the frame level, which may in various embodiments mean that each frame of compressed content 304 is evaluated by partial encryption component 306; based on that evaluation, partial encryption component 306 may determine that the frame is to be encrypted or left in an unencrypted form. The partial encryption component 306 may encrypt or not encrypt each frame in accordance with that determination.

In various embodiments, compressed content 304 may include one or more key frames, reference frames, and/or disposable frames. In some embodiments, partial encryption component 306 may encrypt one or more key frames of compressed content 304 (in some cases all of the key frames). Partial encryption component 306 may also be configured to encrypt one or more reference frames of the compressed content 304. In some embodiments, partial encryption component may evaluate the frames of the compressed content according to their display sequence. In such embodiments, the partial encryption component may be configured to encrypt every $n^{th}$ reference frame (where "n" is a positive integer). For instance, the partial encryption component may be configured to encrypt every other reference frame (e.g., n=2), every $3^{rd}$ reference frame (e.g., n=3), every $8^{th}$ reference frame (e.g., n=8), or some other combination or pattern of reference frames. In some embodiments, reference frames may be encrypted according to other patterns or configurations, which may or may not be predetermined. In other embodiments, partial encryption component 306 may encrypt n % of all of the reference frames (where $0 \leq n \leq 100$) without necessarily encrypting the reference frames based on their display sequence. For instance, the partial encryption component may randomly or pseudorandomly select n % of all reference frames of compressed content 304. In other cases, such selection may not be random. For instance, the partial encryption component may select the n % of all reference frames on the basis of largest data size or smallest data size (e.g., size measured in bytes). The partial encryption component may encrypt each of the selected reference frames without encrypting other ones of the reference frames.

In various embodiments, any of the techniques for encrypting key frames and the techniques for encrypting reference frames described above may be combined to form a more comprehensive encryption process. For instance, in various embodiments, partial encryption component 306 may be configured to encrypt some or all key frames in addition to some or all reference frames. In one particular example, partial encryption component 306 may be configured to encrypt all of the key frames of compressed content 304 and every $n^{th}$ reference frame (where "n" is a positive integer). In some embodiments, modifications may be made to such configuration. For example, the partial encryption component may encrypt only 95% of the key frames or some other percentage of key frames.

In various embodiments, disposable frames of compressed content 304 may or may not be encrypted. In some embodiments, partial encryption component 306 may encrypt none of the disposable frames. In various embodiments, some exception cases may arise that result in partial encryption component 306 encrypting at least some of the disposable frames. These exception cases are described in more detail below.

In various embodiments, partial encryption component 306 may encrypt selected frames of compressed content 304 while leaving other frames unencrypted in an attempt to maximize the ratio of the quantity of frames encrypted to the quantity of processing resources (e.g., processor cycles, memory usage, etc.) expended on the overall encryption of the content. For instance, as described above, compression may create various dependencies among frames of compressed content. For example, in order to fully recreate or render disposable frame 206, a computer system would need to have access to reference frame 204 in the clear (e.g., in unencrypted form). By focusing encryption on one or more key frames and one or more reference frames, the partial encryption component may effectually encrypt any frames that depend on those encrypted frames for decompression. In the example above, if reference frame 204 is encrypted, disposable frame 206 is effectually encrypted because at least a portion of disposable frame cannot be decompressed or rendered until reference frame 204 is decrypted. In this way, partial encryption component 306 may protect two different frames with encryption while only performing encryption on one of such frames.

Figure 7:
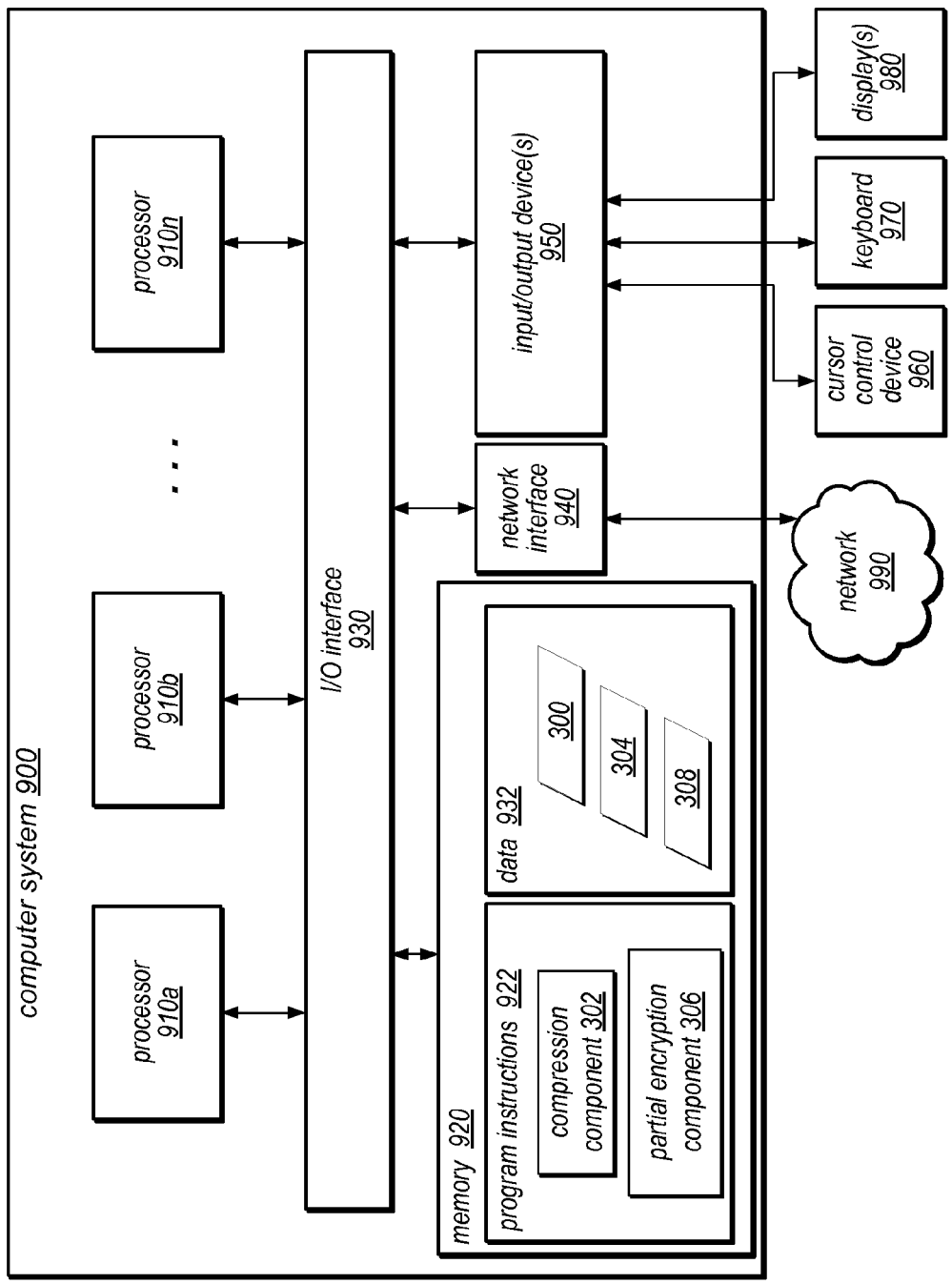
FIG. 7 illustrates an example computer system suitable for implementing various components of the system and method for partial encryption of frame-based electronic content, according to various embodiments.

In various embodiments, partial encryption component 306 may be configured to perform different degrees or levels of encryption on compressed content 304. For instance, as described above, partial encryption component may be configured to encrypt every $n^{th}$ reference frame (where "n" may be selected as any positive integer). In some embodiments, the particular level or degree of encryption utilized by the partial encryption component may be based on user input 307a. In some embodiments, user input 307a may specify a selection of a particular level of encryption to be performed; partial encryption component 306 may be configured to perform the level of encryption selected as indicated by user input 307a. In various embodiments, partial encryption component 306 may provide a user interface on a display, such as described below with respect to FIG. 7. The user interface, illustrated as UI 307b, may include multiple selectable controls that each correspond to a particular level of encryption. For instance, a selectable control may be provided for each of a low, medium, and high encryption level. In other embodiments, other quantities of controls may be provided depending on the level of encryption granularity provided by the partial encryption component. In various embodiments, user input 307a may include information or data that indicates the selection of a particular one of such controls. The partial encryption component may be configured to perform encryption in accordance with that selection.

In embodiments where multiple levels of encryption are provided by partial encryption component 306, the partial encryption component may ensure that the frames that are to be encrypted by a higher level of encryption are a superset of the frames that are to be encrypted by a lower level of encryption. Conversely, it could be said that the partial encryption component may ensure that the frames that are to be encrypted by a lower level of encryption are a subset of the frames that are to be encrypted by a higher level of encryption. In various embodiments, each level of encryption may be associated with a respective encryption configuration. For instance, a "low" level of encryption may be associated with an encryption configuration for encrypting all key frames and one-eighth of the reference frames. A "medium" level of encryption may be associated with an encryption configuration for encrypting all key frames and one-half of the reference frames. A "high" level of encryption may be associated with an encryption configuration for encrypting all key frames and all reference frames.

To ensure that each level of encryption is performed in a hierarchical level (e.g., to ensure that the frames encrypted at one level of encryption are a superset of the frames encrypted at a lower level of encryption), the partial encryption component may determine the level of encryption to be applied to the compressed content. In this example, the level of encryption to be applied is the "medium" level of encryption described above. Next, the partial encryption component may determine if there exist any lower levels of encryption. In this example, the partial encryption component may determine that a "low" level of encryption also exists. Next, the partial encryption component may perform encryption according to the encryption configuration associated with the "medium" level of encryption (e.g., encrypt all key frames and one half of the references frames). Next, the partial encryption component may also perform encryption according to the encryption configuration associated with the "low" level of encryption (e.g., encrypt all key frames and one-eighth of all references frames). When performing the encryption according to the "low" configuration, the partial encryption component 306 may be configured to refrain from encrypting any frame that was already encrypted by the encryption process associated with the "medium" configuration (as encrypting such a frame would be redundant). In various embodiments, the order in which each the "medium" encryption and the "low" encryption are performed by the partial encryption component in the above example may be reversed. In various embodiments, by performing a hierarchical encryption of content, the partial encryption component may be configured to prevent or diminish collusion attacks, such as attacks where different versions of the content (e.g., versions encrypted according to different encryption levels) are compared to one another in an attempt to extract the most unencrypted information possible.

An example of the above-described encryption process performed by partial encryption component 306 is illustrated in FIG. 4, which is collectively described along with FIG. 3. FIG. 4 illustrates a flow diagram that represents the creation of partially encrypted content 420a from compressed content 410a. In the illustrated embodiment, partial encryption process 400 may include any of the techniques described above with respect to the partial encryption component 306. In various embodiments, partial encryption process 400 may also include performing the partial encryption method described below with respect to FIG. 5. In various embodiments, partial encryption component 306 may perform the partial encryption process 400.

As illustrated, compressed content 410a may include multiple key frames (denoted by "K"), multiple reference frames (denoted by "R"), and multiple disposable frames (denoted by "D"). In one embodiment, compressed content 410a is the same as compressed content 304 described above. Note that while the compressed content in the illustrated embodiment include two key frames and various frames in between the key frames, such a configuration is merely an example. In other cases, any number of key frames may be present within the compressed content. The illustrated frames of compressed content 410a may illustrate only a portion of the entire frame based content. Also note that the frames of compressed content 410a are ordered according to display sequence, wherein frames to the left are to be displayed prior to frames to the right.

In the illustrated embodiments, partial encryption process 400 may include performing encryption according to the "medium" encryption configuration described above. More specifically, in the illustrated embodiment, partial encryption process 400 may include encrypting each key frame and every other reference frame (e.g., every $2^{nd}$ reference frame). In the illustrated embodiment, each frame of partially encrypted content 420a may correspond to the frame illustrated directly above in compressed content 410a. As noted by the legend, encrypted frames are denoted by a small lock symbol within the frame; note that such symbol is for illustration purposes only. As illustrated, all key frames of the compressed content have been encrypted in this example. Additionally, every second reference frame in the sequence has been encrypted. In this example, the remaining frames remain unencrypted. However, in other cases, exceptions enforced by the partial encryption component may cause at least some of such frames to be encrypted, as described in more detail below.

In various cases, partial encryption component 306 may refrain from encrypting the disposable frames of compressed content 304. However, in some cases, the partial encryption component may enforce exception rules, which may result in the encryption of at least some disposable frames. In various embodiments, for any of the encryption configurations described above, the partial encryption component may be configured to enforce a constraint on the maximum quantity of consecutive unencrypted frames allowed in the partially encrypted content. FIG. 4B illustrates the enforcement of such a constraint on another portion of the content. In some embodiments, compressed content 410a (FIG. 4A) and compressed content 410b (FIG. 4B) may be different portions of the same frame-based electronic content. For example content 410a and content 410b may be different segments of the same video. Likewise, partially encrypted content 420a (FIG. 4A) and partially encrypted content 420b (FIG. 4B) may be different portions of the same partially encrypted frame-based content.

In various embodiments, the partial encryption component performing process 400 may detect that a quantity of consecutive unencrypted frames has reached a maximum quantity allowed. In the illustrated embodiment, this maximum quantity is 15 frames; however, this value may be different in other embodiments. In some cases, the maximum quantity of consecutive unencrypted frames may be at least in part based on the frame rate and/or a quantification (measured in frames) of a human's ability to perceive moving pictures or video. For instance, in one example, video becomes human perceptible after one-half of one second. If the frame rate of the video were 30 fps, the video in this example would become human perceptible after 15 consecutive unencrypted frames. In various embodiments, the maximum quantity of consecutive unencrypted frames may be configured to prevent human perceptibility of data based on this property. For instance, for content having a larger frame rate, the maximum quantity of consecutive unencrypted frames may be set to a larger value.

In FIG. 4B, one example of the aforesaid sequence of consecutive unencrypted frames is illustrated as maximum unencrypted frames sequence 430. In response to detecting a consecutive sequence of unencrypted frames of this maximum length (15 frames in this example), the partial encryption component may in some embodiments encrypt the very next frame, irrespective of the frame type (e.g., key, reference, disposable). In other embodiments, as is the case in the illustrated embodiment, the partial encryption component may be configured to enforce a tolerance on the maximum unencrypted sequence 430; such tolerance may be expressed as a quantity of frames or as a percentage of the maximum quantity of consecutive unencrypted frames. In the illustrated embodiments, this value is equivalent to 5 frames or approximately 33% of the maximum quantity of consecutive unencrypted frames. In the illustrated embodiment, this tolerance is illustrated as maximum unencrypted sequence tolerance 440. In other cases, other values for tolerance may be utilized.

To enforce this tolerance, the partial encryption component may be configured to determine whether a reference frame is present within the frames of the tolerance range. In response to determining that a reference frame is present within that range, the partial encryption component may encrypt that reference frame. For instance, in FIG. 4B, a reference frame is present within the range of tolerance 400. Accordingly, that reference frame has been encrypted in this example. A scenario where the tolerance range does not include a reference frame is described below with respect to FIG. 4C.

Figure 4A:
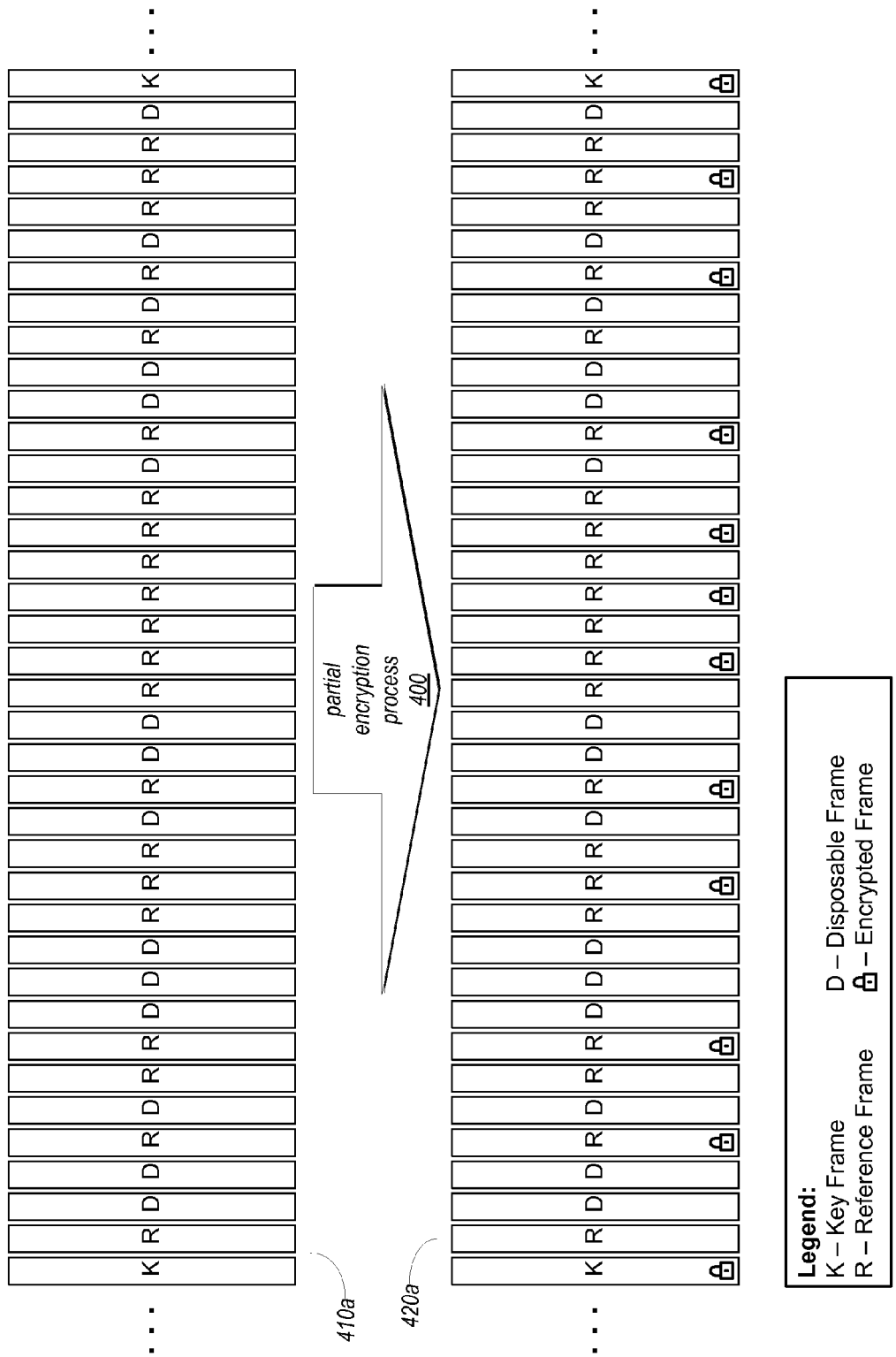
Figure 4B:
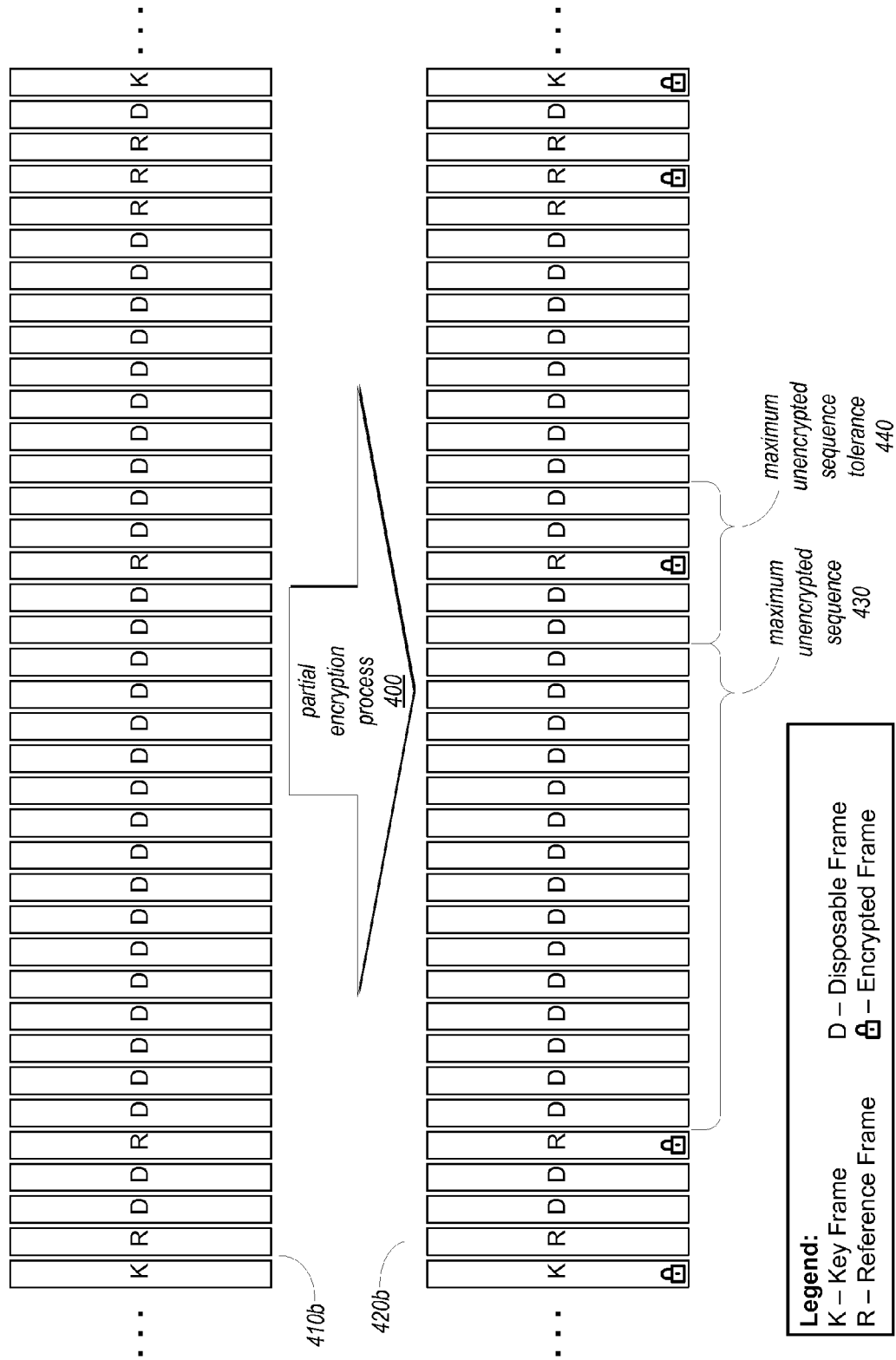

FIG. 4C illustrates the enforcement of such a constraint on another portion of the content. In various embodiments, compressed content 410c (FIG. 4C), compressed content 410a (FIG. 4A) and compressed content 410b (FIG. 4B) may be different portions of the same frame-based electronic content. For example content 410a, 410b and 410c may be different segments of the same video. Likewise, partially encrypted content 420c (FIG. 4C), partially encrypted content 420a (FIG. 4A) and partially encrypted content 420b (FIG. 4B) may be different portions of the same partially encrypted frame-based content. Additionally, maximum unencrypted sequence 435 is similar to maximum unencrypted sequence 430 described above. Likewise, maximum unencrypted sequence tolerance 445 is similar to maximum unencrypted sequence tolerance 440 described above. The illustrated embodiment is similar to that of FIG. 4B. However, in this case, the tolerance range of frames does not include a reference frame. In such cases, the partial encryption component may be configured to encrypt the very next frame after the tolerance range, irrespective of the frame type (key, reference or disposable). In the illustrated embodiment, the very next frame after the tolerance range is a disposable frame, which is encrypted by the partial encryption component.

Note that in the above-described embodiments compressed content 410a-c and partially encrypted content 420a-c are merely examples of compressed content 304 and partially encrypted content 308, respectively. Also note that in any of the embodiments described herein, the content may include audio data or information in addition to the various frames described above. In such embodiments, the partial encryption component may be configured to encrypt all or a portion of such audio data. Such audio data (fully encrypted or partially encrypted) may be included within partially encrypted content 308.

In some cases, compression schemes or codecs may include error resiliency mechanisms designed to overcome random losses of data within frame-based electronic content. For example, at content consumption time (e.g., video playback time), if a playback component is missing one or more portions of content (e.g., portions of content lost during transmission over a network), the playback component may utilize error resiliency techniques to interpolate or predict content data based on other frames of the content. In some cases, the goal of using such interpolated frames is not to completely and accurately recreate the original content, but instead to improve the appearance of playback and to minimize the perceptibility of any missing frame information. In various embodiments, the manner in which partial encryption component 306 encrypts content may prevent such error resiliency techniques from being utilized to overcome encryption protection. For instance, in various cases, the above-described error resiliency techniques may only be effective at overcome a certain percentage of random byte-level data losses. By implementing the encryption techniques described herein at the frame-level for specifically selected frames (e.g., all key frames and some combination of reference frames), the partial encryption component described herein may prevent error resiliency techniques from being successfully applied to the partially encrypted content described herein. For instance, if such error resiliency techniques were applied to partially encrypted content (absent actual decryption of the content), the resulting content may not have enough frame information or data to be intelligible by a viewer.

In addition to the encryption techniques described above, partial encryption component 306 may also be configured to encrypt data based on I-frame, B-frame, or P-frame designations (e.g., the designations described above with respect to FIG. 1). For example, in some embodiments, in addition to the performing any of the various encryption techniques described above, the partial encryption component may be configured to encrypt the frame-based content such that all I-frames of the partially encrypted content are encrypted. In various cases, some I-frames may not be depended upon by other frames and thus may be disposable frames. In some cases, if such frames are not encrypted, they may be "in the clear" (e.g., unprotected by encryption) in the partially encrypted content. The above described encryption technique may prevent such I-frames from being unencrypted in the partially encrypted content.

Example Methods

The system and method for partial encryption of frame-based electronic content may include various methods, examples of which are described below in regard to FIGS. 5-6. In various embodiments, such methods may be performed by the computer system of FIG. 7, described in more detail below. In various embodiments, the methods described herein may be performed by partial encryption component 306 described above.

Figure 5:
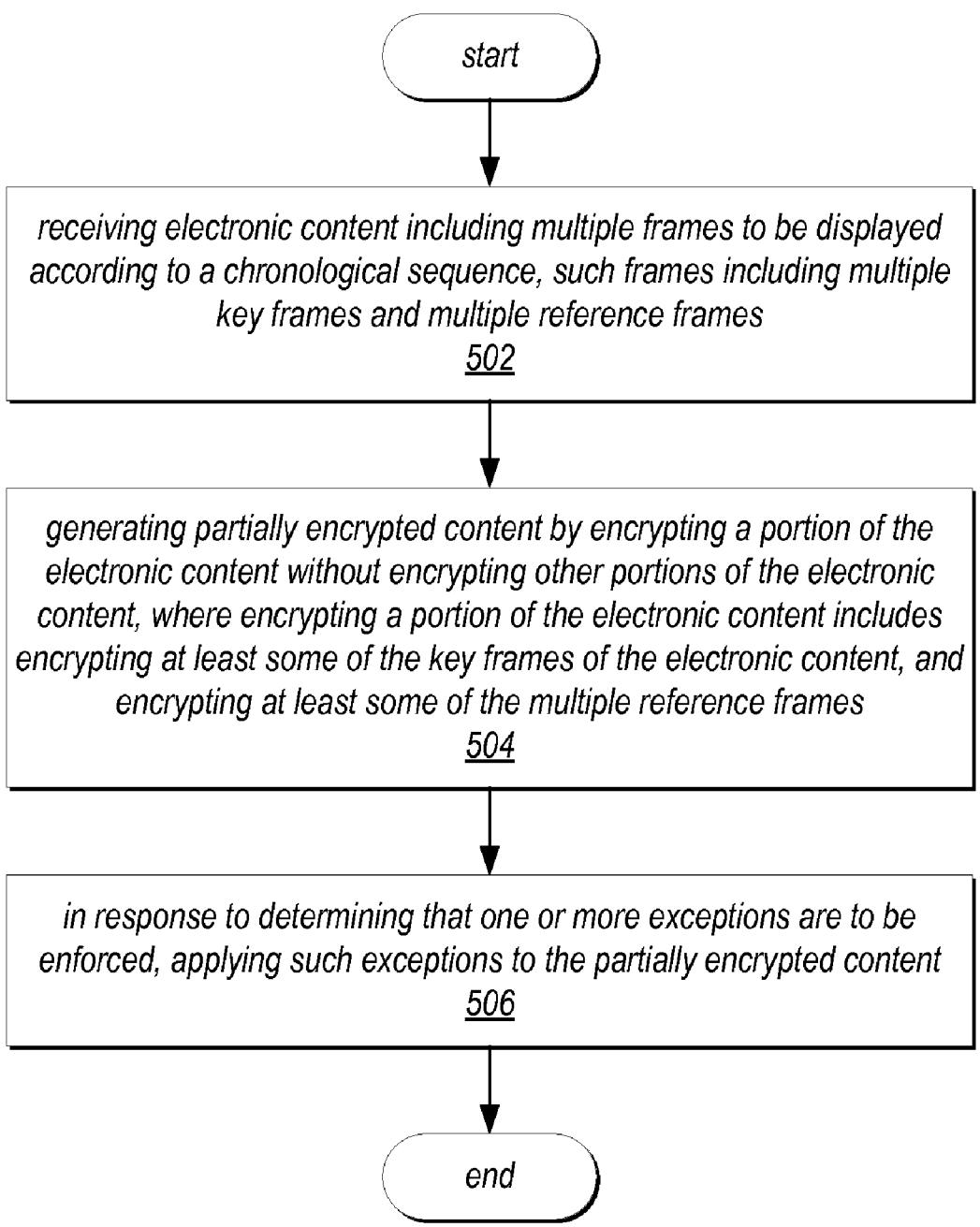
FIG. 5 illustrates a flowchart of an example method for performing partial encryption of frame-based electronic content, according to some embodiments.

FIG. 5 illustrates a flowchart of an example method for partially encrypting frame-based content. As illustrated by block 502, the method may include receiving electronic content including multiple frames to be displayed according to a chronological sequence; such frames may include multiple key frames and multiple reference frames. In various embodiments, for each reference frame, content of one or more other frames may be dependent on content of that reference frame, such as described above with respect to FIGS. 2-4C. In various embodiments, for each key frame, content of frames to be display subsequent to that key frame according to the chronological sequence is not dependent on content of any frame preceding the key frame according to the chronological sequence. One example of such a chronological sequence includes the display sequence described above. As described above, such display sequence may be explicitly or implicitly specified within the frame-based content.

As illustrated by block 504, the method may also include generating partially encrypted content by encrypting a portion of the electronic content without encrypting other portions of the electronic content. In various embodiments, encrypting a portion of the electronic content may include encrypting at least some of the key frames of the electronic content, and encrypting at least some of said multiple reference frames. Generally, this portion of the method may include any of the encryption techniques described above, such as those described with respect to FIGS. 3-4C. For example, in some embodiments, the method may include encrypting every key frame of the content and a particular pattern of reference frames of the electronic content based on the chronological sequence according to which such reference frames are displayed. For instance, in one example, the method may include encrypting every $n^{th}$ reference frame of the content (where "n" is a positive integer).

As illustrated by block 506, the method may in some embodiments include determining that one or more exceptions are to be enforced on the partial encryption and in response to that determination applying such exceptions to the partially encrypted content. For example, in various embodiments, the partially encrypted content may include one or more sequences of consecutive unencrypted frames, such as described above with respect to FIGS. 4A-C. In such cases, the method may include generating the partially encrypted content such that none of the one or more sequences include a quantity of frames greater than a specified maximum quantity of frames, such as described above with respect to FIGS. 4B-C. In various embodiments, another exception that may be enforced in some embodiments may include the encryption of all I-frames, such as described above with respect to FIGS. 3-4C.

In various embodiments, the method may include providing multiple selectable controls each of which may be associated with a different quantity of reference frames to be encrypted. For instance, the method may include providing such controls through a user interface, such as user-interface 307b of FIG. 3. In various embodiments, each of such controls may correspond to a different encryption configuration, such as the "low," "medium," and "high" encryption configurations described above. In various embodiments, the method may also include determining that a particular one of the selectable controls has been selected. For instance, the method may include determining that user input (e.g., user input 307a described above) indicates the selection of a particular one of the selectable controls. In various embodiments, encrypting the multiple reference frames may include encrypting a quantity of reference frames corresponding to the selected control. For instance, as described above, each control may be associated with a different encryption configuration (e.g., the "low," "medium," and "high" encryption configurations described above). Each of such encryption configurations may specify a different quantity of reference frames to encrypt (e.g., every other reference frame, every eighth reference frame, etc.). The method may include encrypting the reference frames in accordance with the encryption configuration corresponding to the selected control. In various embodiments, each encryption configuration (or "encryption level") may also specify which, if any, exceptions or tolerances are to be applied during encryption. Examples of exceptions include the maximum unencrypted sequences described with respect to FIGS. 4B and 4C as well as the enforcement of minimum percentage of encrypted data on a per-window basis (described in more detail with respect to FIG. 6). One example of a tolerance that may vary across different encryption configuration includes tolerances 440 and 445 described above.

As described above, each selectable control may correspond to an encryption configuration that specifies a particular pattern or a particular quantity of reference frames to encrypt. In various embodiments, each of such encryption configurations may also specify other encryption parameters. For instance, in various embodiments, each selectable control (e.g., low, medium, high, etc.) may correspond to a different lengths for maximum unencrypted sequences (e.g., different quantities of frames permitted in such sequences), such as maximum unencrypted sequences 430 and 435. In another example, each selectable control may correspond to a different tolerance value for such unencrypted sequences, such as maximum unencrypted sequence tolerances 440 and 445. In some embodiments, each selectable control may correspond to a different minimum percentage of encrypted data (overall or on a per-window basis) required, such as the minimum percentage of encrypted data described below in more detail with respect to FIG. 6B.

In various embodiments, the electronic content may include multiple disposable frames, such as described above with respect to FIGS. 1-2. In such embodiments, generating the partially encrypted content may include encrypting at least some of those disposable frames, such as described above with respect to FIGS. 3-4C.

Figure 6A:
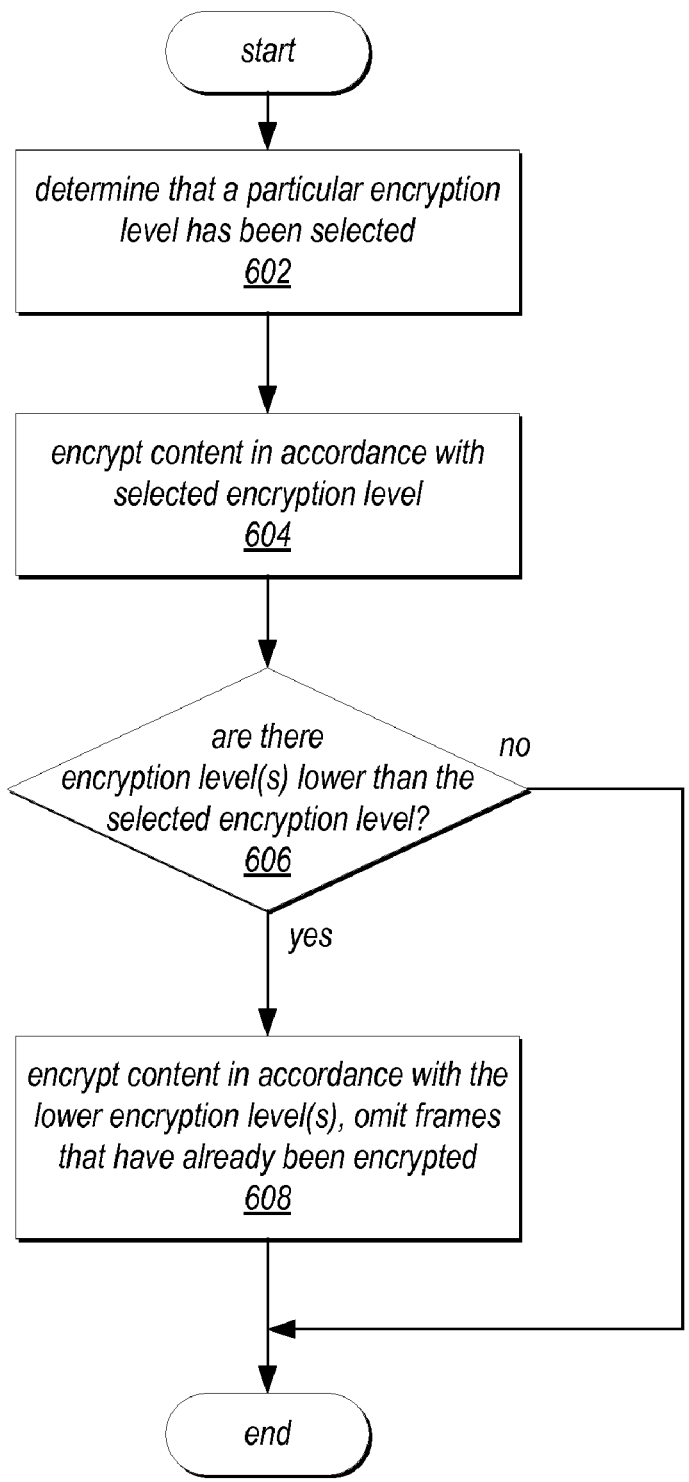
FIG. 6A illustrates a flowchart of an example method for ensuring that different encryption configurations are performed in a hierarchical manner, according to some embodiments.

FIG. 6A illustrates a flowchart of an example method for ensuring that encryption is performed in a hierarchical manner. For instance, as described above, in embodiments where multiple levels of encryption are provided, the method may ensure that the frames that are to be encrypted by a higher level of encryption are a superset of the frames that are to be encrypted by a lower level of encryption. In various embodiments, ensuring this superset property remains valid may include performing the method of FIG. 6A. Examples of different encryption levels are also described above. For instance, in various embodiments, each level of encryption may be associated with a respective encryption configuration. For instance, a "low" level of encryption may be associated with an encryption configuration for encrypting all key frames and one-eighth of the reference frames. A "medium" level of encryption may be associated with an encryption configuration for encrypting all key frames and one-half of the reference frames. A "high" level of encryption may be associated with an encryption configuration for encrypting all key frames and all reference frames. Of course, these configurations that define the various levels of encryption are merely examples. In other embodiments, different types of encryption levels and/or different quantities of encryption levels may be utilized.

As illustrated by block 602, the method may include determining that a particular encryption level has been selected. In various embodiments, this may include receiving such a selection through a user interface, such as user interface 307b described above. In various embodiments, such a selection may be specified by user input, such as user input to a computer system. In one example, the medium encryption level described above is selected. This level of encryption may correspond to encrypting all key frames and every other reference frame, as described above.

As illustrated by block 604, the method may also include encrypting frame-based electronic content in accordance with the selected encryption level. In various embodiments, this may include performing any of the partial encryption techniques described herein. In one example, the selected encryption level is the medium encryption level and encrypting the content may include encrypting all key frames and every other reference frame. As illustrated by block 606, the method may include determining whether there are encryption level(s) lower than the selected encryption level. If not (as illustrated by the negative output of block 604), the method may end. If there are encryption levels lower than the selected encryption level (as illustrated by the positive output of block 606), the method may include encrypting the content in accordance with such lower encryption level(s) while omitting frames that have already been encrypted in accordance with the selected encryption level (e.g., to avoid redundantly encrypting the content). For example, if the "medium" level of encryption had been selected, the method may include identifying the "low" level of encryption. In some cases, lower levels of encryption may be defined as levels of encryption that encrypt a smaller quantity of reference frames. For instance, the medium level of encryption may encrypt every other reference frame (e.g., every $2^{nd}$ reference frame) whereas the low level of encryption may encrypt every eighth reference frame. By consistently performing partial encryption according to the illustrated method, various embodiments may ensure that higher levels of encryption encrypt supersets of the frames encrypted by lower levels of encryption.

Figure 6B:
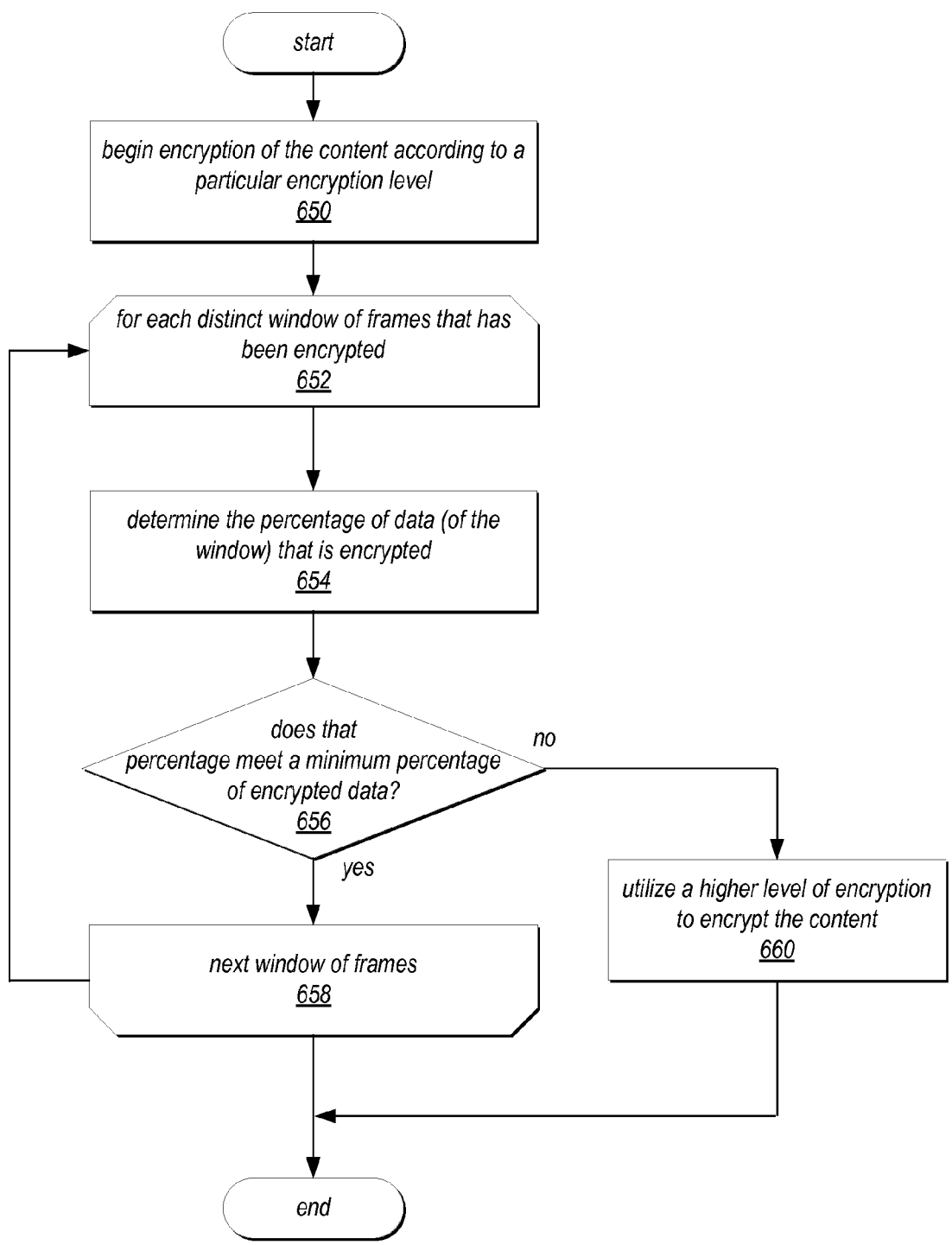
FIG. 6B illustrates a flowchart of an example method for ensuring that a minimum percentage of data is encrypted for each window of frames in frame-based electronic content, according to some embodiments.

FIG. 6B illustrates a flowchart of an example method for ensuring that a given level of encryption will result in a minimum percentage of encrypted data on a per-window basis. As illustrated by block 650, the method may include encrypting the content in accordance with a particular encryption level, such as an encryption level specified through a user interface (e.g., UI 307b described above). As illustrated by blocks 652 and 658, certain portions of the method (e.g., blocks 654 and 656) may be implemented on a per-window basis for portions of the content that have been partially encrypted according to the encryption techniques described herein. In various embodiments, each distinct window of the content may be evaluated; such windows may be overlapping or non-overlapping in various embodiments. In various embodiments, each distinct window may have a uniform length that may be configurable (e.g., 30 frames, or some other window length).

As illustrated by block 654, the method may include, for the current window, determining the percentage of data that is encrypted in that window. In one example, this percentage may be equivalent to the quantity of encrypted bits divided by the quantity of overall bits in the window. As illustrated by block 656, the method may include determining whether that determined percentage meets a minimum percentage of encrypted data for the window. In various embodiments, this minimum percentage may be based on the quantity of reference frames that are encrypted in the content. In some embodiments, this minimum percentage may be determined as a function of the total quantity of reference frames selected for encryption. Generally, the more reference frames that are encrypted, the larger the minimum percentage will be.

As illustrated by the positive output of block 656, if it is determined that the percentage of encrypted data meets the minimum percentage (e.g., the percentage of encrypted data is greater than or equal to the minimum percentage), the method may proceed to evaluate the next window (or the method may end if there are no more windows to evaluate). As illustrated by the negative output of block 656, if the percentage of encrypted data does not meet the minimum percentage, the method may include utilizing a higher level of encryption to encrypt the content (block 660). For instance, if the method were performed for a "low" level of encryption, block 660 may include utilizing a "medium" or "high" level of encryption. In various embodiments, the method may be repeated for those encryption levels as well. In various embodiments, if the method determines that a higher level of encryption may be utilized, the method may also include preventing the selection of a control that pertains to encryption levels lower than that higher level of encryption. For instance, if the method of FIG. 6B were performed for a "low" level of encryption and it was determined at block 660 that a higher level of encryption is to be utilized, the method may include preventing the selection of the "low" level encryption on a user interface. For example, the method may include deactivating a selectable control that corresponds to the low level of encryption. In various embodiments, deactivated controls may not be selectable after deactivation.

Example Computer System

Various embodiments of a system and method for partial encryption of frame-based electronic content, as described herein, may be executed on one or more computer systems, which may interact with various other devices. One such computer system is computer system 900 illustrated by FIG. 7, which may in various embodiments implement any of the elements or functionality illustrated in FIGS. 1-6. In various embodiments, computer system 900 may be configured to implement compression component 302 and/or partial encryption component 306 described above. While the illustrated system demonstrates computer system 900 implementing compression component 302 and partial encryption component 306, computer system 900 may be used to implement any other system, device, element, functionality or method of the above-described embodiments. In the illustrated embodiments, computer system 900 may be configured to implement compression component 302 and partial encryption component 306 as processor-executable executable program instructions 922 (e.g., program instructions executable by processor(s) 910) in various embodiments.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In various embodiments, any of components 960-980 may be utilized by the partial encryption component to receive user input 307a described above. In various embodiments, a user interface (e.g., user interface 307b) may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, data 932 may include data content 300, compressed content 304 and partially encrypted content 308 configured as described above. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the methods described above, such as the methods illustrated by the flowcharts of FIGS. 5-6B. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. In general, a computer-accessible medium may include a computer-accessible storage medium or computer-accessible memory medium such as magnetic or optical media, e.g., disk or DVD/CD-ROM, volatile or nonvolatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
   receiving electronic content comprising a plurality of frames to be displayed according to a chronological sequence, the plurality of frames including multiple key frames and multiple reference frames; wherein for each reference frame, content of one or more other frames of the plurality of frames is dependent on the content of that reference frame; wherein for each key frame, content of frames to be displayed subsequent to that key frame is not dependent on content of any frame preceding the key frame according to the chronological sequence; and
   generating partially encrypted content by encrypting a portion of the electronic content without encrypting other portions of the electronic content, wherein encrypting a portion of the electronic content comprises:
      encrypting at least some of the key frames of the electronic content; and
      encrypting at least some of said multiple reference frames of the electronic content including encrypting a particular pattern of reference frames based at least in part on the chronological sequence.

2. The computer-implemented method of claim 1, wherein encrypting a portion of the electronic content comprises:
   encrypting all of the multiple key frames.

3. The computer-implemented method of claim 2, wherein encrypting a particular pattern of reference frames based on the chronological sequence comprises:
   encrypting every $n^{th}$ reference frame of said sequence, wherein n is a positive integer greater than 1.

4. The computer-implemented method of claim 1, wherein the partially encrypted content includes one or more sequences of consecutive unencrypted frames, wherein the method comprises generating the partially encrypted content such that none of said one or more sequences include a quantity of frames greater than a specified maximum quantity of frames.

5. The computer-implemented method of claim 1, wherein the method comprises:
   providing a plurality of selectable controls, wherein each selectable control corresponds to a different encryption configuration; and
   determining that a particular one of said selectable controls has been selected;
   wherein encrypting at least some of said multiple reference frames comprises encrypting the reference frames in accordance with the encryption configuration corresponding to the selected control, wherein that encryption configuration specifies one or more of: a quantity of reference frames corresponding to the selected control, a maximum quantity of consecutive unencrypted frames, and a tolerance for the maximum quantity of consecutive unencrypted frames.

6. The computer-implemented method of claim 5, wherein the method comprises deactivating a particular selectable control in response to determining that the selectable control corresponds to an encryption configuration that does not result in the encryption of a specified minimum percentage of the content.

7. The computer-implemented method of claim 6, wherein said specified minimum percentage of the content is dependent on the quantity of reference frames encrypted.

8. The computer-implemented method of claim 1, wherein the electronic content comprises a plurality of disposable frames, wherein generating partially encrypted content comprises encrypting at least some of said plurality of disposable frames.

9. The computer-implemented method of claim 1, wherein said generating partially encrypted content is associated with a first level of encryption, wherein the method comprises:
   identifying a lower level of encryption associated with the encryption of a smaller quantity of reference frames relative to the quantity of reference frames encrypted by the first level of encryption; and
   encrypting one or more reference frames associated with the lower level of encryption without encrypting reference frames that have already been encrypted in accordance with the first level of encryption.

10. A system, comprising:
    a memory; and
    one or more processors coupled to the memory, wherein the memory comprises program instructions executable by the one or more processors to implement a partial encryption component configured to:
       receive electronic content comprising a plurality of frames to be displayed according to a chronological sequence, the plurality of frames including multiple key frames and multiple reference frames; wherein for each reference frame, content of one or more other frames of the plurality of frames is dependent on the content of that reference frame; wherein for each key frame, content of frames to be displayed subsequent to that key frame is not dependent on content of any frame preceding the key frame according to the chronological sequence; and
       generate partially encrypted content by encrypting a portion of the electronic content without encrypting other portions of the electronic content, wherein to encrypt a portion of the electronic content, the partial encryption component is configured to:
          encrypt at least some of the key frames of the electronic content; and
          encrypt at least some of the multiple reference frames of the electronic content including encrypt a particular pattern of reference frames based at least in part on the chronological sequence.

11. The system of claim 10, wherein to encrypt a portion of the electronic content the partial encryption component is configured to:
    encrypt all of the multiple key frames.

12. The system of claim 11, wherein to encrypt a particular pattern of reference frames based at least in part on the chronological sequence the partial encryption component is configured to:

encrypt every $n^{th}$ reference frame of said sequence, wherein n is a positive integer greater than 1.

13. The system of claim 10, wherein the partially encrypted content includes one or more sequences of consecutive unencrypted frames, wherein the partial encryption component is configured to generate the partially encrypted content such that none of said one or more sequences include a quantity of frames greater than a specified maximum quantity of frames.

14. The system of claim 10, wherein the partial encryption component is configured to:

provide a plurality of selectable controls, wherein each selectable control corresponds to a different encryption configuration; and determine that a particular one of said selectable controls has been selected;

wherein to encrypt at least some of said multiple reference frames the partial encryption component is configured to encrypt the reference frames in accordance with the encryption configuration corresponding to the selected control, wherein that encryption configuration specifies one or more of: a quantity of reference frames corresponding to the selected control, a maximum quantity of consecutive unencrypted frames, and a tolerance for the maximum quantity of consecutive unencrypted frames.

15. The system of claim 14, wherein the partial encryption component is configured to deactivate a particular selectable control in response to determining that the selectable control corresponds to an encryption configuration that does not result in the encryption of a specified minimum percentage of the content.

16. The system of claim 10, wherein the electronic content comprises a plurality of disposable frames, wherein to generate the partially encrypted content the partial encryption component is configured to encrypt at least some of said plurality of disposable frames.

17. The system of claim 10, wherein the generation of partially encrypted content is associated with a first level of encryption, wherein the partial encryption component is configured to:

identify a lower level of encryption associated with the encryption of a smaller quantity of reference frames relative to the quantity of reference frames encrypted by the first level of encryption; and encrypt one or more reference frames associated with the lower level of encryption without encrypting reference frames that have already been encrypted in accordance with the first level of encryption.

18. A non-transitory computer-readable storage medium, storing program instructions computer-executable on a computer system to implement a partial encryption component configured to:

receive electronic content comprising a plurality of frames to be displayed according to a chronological sequence, the plurality of frames including multiple key frames and multiple reference frames; wherein for each reference frame, content of one or more other frames of the plurality of frames is dependent on the content of that reference frame; wherein for each key frame, content of frames to be displayed subsequent to that key frame is not dependent on content of any frame preceding the key frame according to the chronological sequence; and generate partially encrypted content by encrypting a portion of the electronic content without encrypting other portions of the electronic content, wherein to encrypt a portion of the electronic content, the partial encryption component is configured to:

encrypt at least some of the key frames of the electronic content; and encrypt at least some of the multiple reference frames of the electronic content including encrypt a particular pattern of reference frames based on the chronological sequence.

19. The medium of claim 18, wherein to encrypt a portion of the electronic content the partial encryption component is configured to:

encrypt all of the multiple key frames.

20. The medium of claim 19, wherein to encrypt a particular pattern of reference frames based on the chronological sequence the partial encryption component is configured to:

encrypt every $n^{th}$ reference frame of said sequence, wherein n is a positive integer greater than 1.

* * * * *